United States Patent [19]

Rehm

[11] 4,442,007

[45] Apr. 10, 1984

[54] ACTIVATED SEAWATER WASTEWATER TREATMENT SYSTEM

[76] Inventor: Russell H. Rehm, 1505 Washington St., Bath, Me. 04530

[21] Appl. No.: 425,581

[22] Filed: Sep. 28, 1982

[51] Int. Cl.³ .............................................. C02F 3/02
[52] U.S. Cl. .................................. 210/631; 210/759; 210/137; 210/199; 210/202; 210/206
[58] Field of Search ............... 210/620, 631, 752, 758, 210/759, 760, 761, 762, 763, 764, 765, 201, 203, 202, 205, 206, 207, 208, 747, 170, 97, 137, 614

[56] References Cited

U.S. PATENT DOCUMENTS

| | | | |
|---|---|---|---|
| 1,907,691 | 5/1933 | Wait | 210/760 |
| 2,495,937 | 1/1950 | Lawlor | 210/758 |
| 2,809,933 | 10/1957 | Halvorson | 210/759 |
| 3,442,802 | 5/1969 | Hamilton | 210/763 |
| 3,487,015 | 12/1969 | Boester | 210/758 |
| 3,487,016 | 12/1969 | Zeff | 210/631 |
| 3,715,309 | 2/1973 | Zumbrunn | 210/759 |
| 3,804,755 | 4/1974 | Cervantes | 210/760 |
| 4,098,689 | 7/1978 | Kobayashi | 210/631 |
| 4,128,477 | 12/1978 | Nebolsine | 210/760 |
| 4,160,724 | 7/1979 | Laughton | 210/760 |

FOREIGN PATENT DOCUMENTS

| | | | |
|---|---|---|---|
| 2291687 | 7/1976 | France | 210/763 |
| 53-108068 | 9/1978 | Japan | 210/759 |
| 56-168896 | 12/1981 | Japan | 210/631 |
| 888784 | 2/1962 | United Kingdom | 210/760 |

OTHER PUBLICATIONS

Ayling, "Waste Treatment with Hydrogen Peroxide," Chemical Engineering, Nov. 30, 1981, 79-82.

*Primary Examiner*—Ernest G. Therkorn
*Attorney, Agent, or Firm*—Nicholas J. Aquilino

[57] ABSTRACT

A wastewater treatment system for use in treating household wastewater particularly for tidal coastal areas where seawater is plentiful and fresh water may be scarce. The system uses a source of seawater, preferably from a central storage location, to which hydrogen peroxide has been added. Individual households are provided with the seawater-hydrogen peroxide mixture as flushwater directly into the toilet flush tanks. The discharge from each household, including wastes from toilets, bathing, wash and kitchen units, is fed to a series of two or three reaction chambers, and a filter unit before being drained back into the tidal waters. The system includes also a bypass line independent of the flushing mechanisms to provide a continuous source of the seawater-hydrogen peroxide mixture directly into the reaction chambers to insure continuous aerobic biochemical reaction with solids in the reaction chambers thus providing for continuous reaction independent of fluctuating rate of usage of the household waste systems.

12 Claims, 3 Drawing Figures

ACTIVATED SEAWATER WASTEWATER TREATMENT SYSTEM

BACKGROUND OF THE INVENTION

The present invention relates to wastewater treatment systems, and more particularly to a wastewater treatment system using seawater and hydrogen peroxide for treating household wastes in reaction chambers and discharging the treated wastewater into receiving tidal seawater.

The present system is particularly adapted for use with small communities which are seaside or located near tidal basins where heretofore wastewater was dumped directly into tidal waters. The system is particularly adapted for areas where fresh water is not plentiful and seawater is used for flushing waste from household systems. Previously known wastewater treatment processes have used septic tanks with sand filters and chlorinators, septic tanks with leach beds for ground disposal, mechanical aeration means, including mechanical air blowers, transfer pumps and complex agitation schemes to rapidly decompose the water borne waste and special toilets with incinerators, holding tanks, equipment for recycling or treatment and recirculating, composters, and chemical disinfectants and deodorizers. Whereas most of these commercially available versions are well conceived and designed, the results they achieve when installed require favorable conditions. In coastal communities where the availability of fresh water becomes a problem, it may be necessary to rely on seawater for flushing toilets. This introduces an unacceptable probability of failure in conventional biochemical decomposition processes because of toxic shock loading of the biological system if large volumes of seawater and fresh water are charged alternately. The high salinity discharge damages leaching fields and sand filters by reducing porosity and adsorptive capacity. When septic tanks are used, a high sodium ion and chloride ion content of the seawater-based effluent degrades the adsorptive capacity of a soil filtration medium.

Other problems of significance relate to the locations and general accessibility of seaside and other tidal communities. Often these communities are built on islands which are not accessible by land and this creates problems in transportation of both materials and equipment. Other problems include inadequate soil for leaching or sludge disposal purposes and the general character of the terrain which makes installation and maintenance of complex systems a difficult problem.

The present system is adapted for use in small summer vacation communities which are located adjacent to tidal seawater and which use such water for waste disposal. One example is MacMahan Island which is located in the Sheepscot Bay area of Maine. This community includes approximately forty (40) privately owned cottages and has a peak population during the summer vacation months. The island terrain is rocky and the soil cover is generally shallow and inadequate for septic tank operation or sludge disposal. Seawater is used for flushing toilets in the cottages to conserve fresh water, the supply of which is provided by deep wells and is limited during peak seasonal demand times. Transportation access to the island is by water craft only.

The cottages are equipped with incoming salt water and fresh water service lines and with sewage discharge lines to the shore. Seawater is pumped in at a single location from below the tidal shore into an elevated storage tank on the island and transmitted on demand to the individual cottages for flushing toilets and other waste removal. This reduces the demand for fresh water which is supplied from a separate source and required for drinking, cooking, and so forth. Because of the location of the island, the discharge of untreated waste into the surrounding tidal waters would cause severe health and environmental problems.

To overcome these difficulties, the waste treatment system of the present invention has been developed. The system includes a source of seawater which is preferably stored in a large tank or container. Not only is seawater plentiful in tidal areas, but it also includes natural microbia and aerobic microorganisms which aid in the decomposition of solid waste materials. Hydrogen peroxide is added to the stored seawater and the mixture is designed to be fed to individual households using a gravity or pump feed arrangement. The hydrogen peroxide provides a disinfecting capability to the mixture as well as being a source of oxygen. The activated seawater is fed directly into the waste treatment systems of the individual cottages or households and is used to flush toilets and to aid in carrying away other gray matter wastes from the kitchen, washwater, and so forth. The outlet pipes from the cottages containing the activated seawater and wastes are fed to a treatment location, including a series of two or three drum reaction containers. The outlet of these reaction containers is fed into a filter container which distributes the wastewater over a filter bed which removes any residual impurities. The filtered water is then discharged to the tidal water as an odorless disinfected liquid which has no adverse affects upon the environment. The system includes a bypass line which feeds activated seawater directly from the storage tank into the reaction vessels thereby providing a continuous aerobic biochemical reaction and solids separation independent of the useage of the household waste systems.

Among the objects of the present invention are a provision of a wastewater treatment system particularly adapted for seaside or other tidal communities where fresh water and commercial sewage treatment facilities are limited. Another object of the present invention is to provide a wastewater treatment system which can be used in individual households and which is inexpensive to install, maintain, and operate.

DESCRIPTION OF THE PREFERRED EMBODIMENTS

Figure 1:
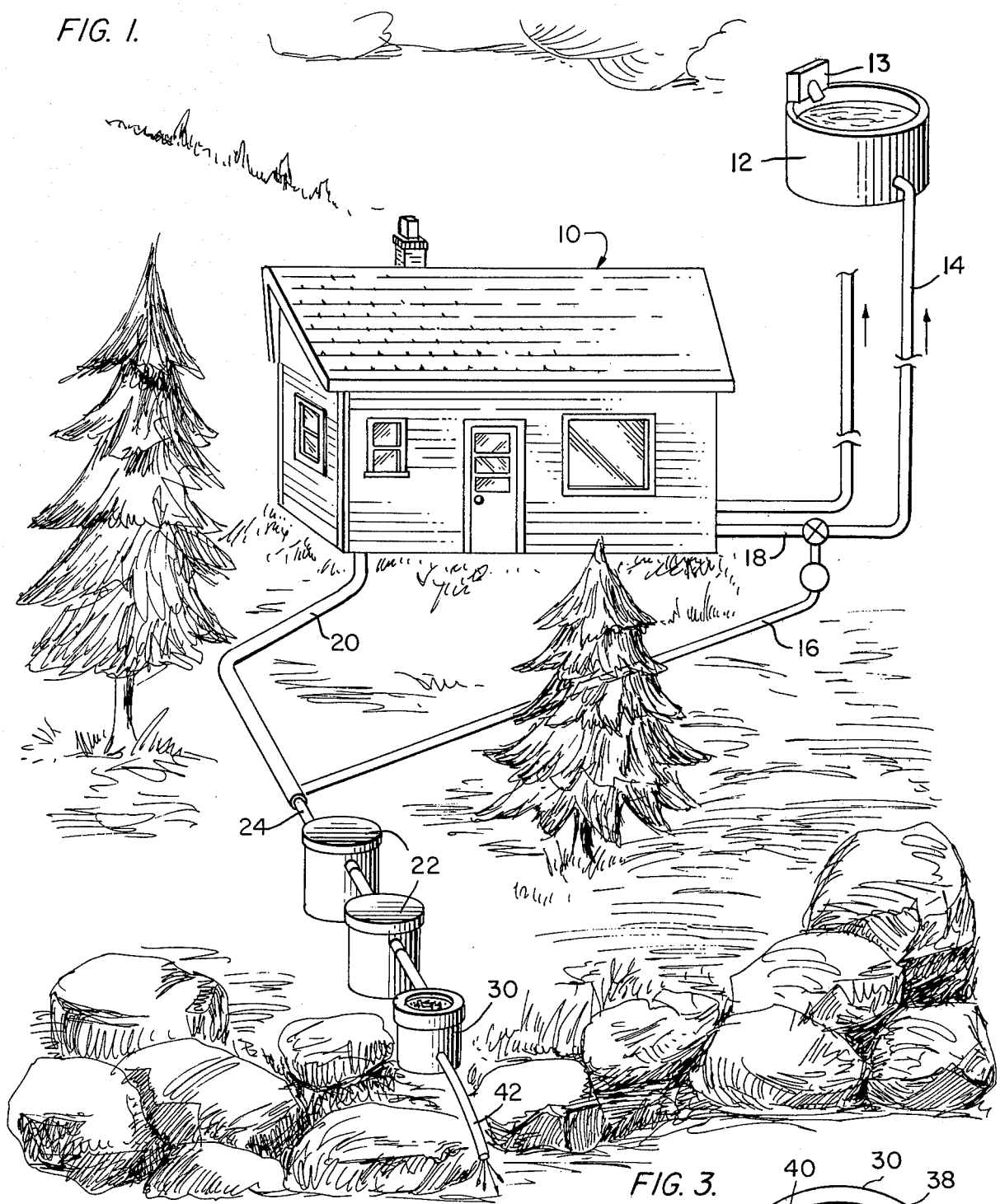
FIG. 1 is schematic of the wastewater treatment system of the present invention.
Figure 2:
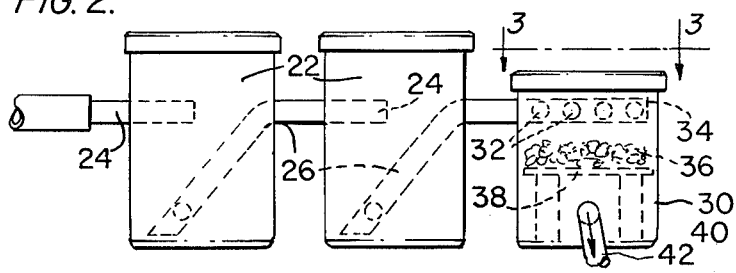
FIG. 2 is a detail of the system of FIG. 1.
Figure 3:
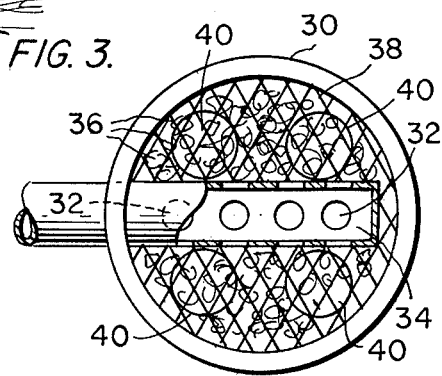
FIG. 3 is a view taken along the line 3—3 of FIG. 2.

FIG. 1 illustrates a schematic representation of the wastewater treatment system of the present invention. The schematic shows one building or cottage 10, however, it will be appreciated that ideally any number of buildings would normally be included in the system depending upon location and so forth. Preferably, the system includes a central source of seawater which is held in a large storage or holding tank 12. The tank 12 is fed from a suitable pumping system (not shown) to maintain it full of seawater taken from below the nearby tidal shore. The tank 12 also includes a suitable means 13 for mixing hydrogen peroxide with the seawater which may be automatic or manual as the seawater is drained and replenished. For a storage tank size of 700 cubic feet (19.8 cubic meters), 6.6 pounds (3 kg) of active ingredients (hydrogen peroxide) is added to the full tank 12. The hydrogen peroxide is replaced at a rate of 20 pounds (9.1 kg) per day during the peak vacation month of August to maintain the necessary concentration for the waste treatment.

An outlet pipe 14 from the storage tank 12 feeds the hydrogen peroxide activated seawater to the individual buildings by gravity or a pump feed system. The activated seawater line 14 includes a valve 15 and bypass line 16. One line 18 goes directly into the building 10 where it is suitably connected to the toilet facilities in order to flush and transport the wastes from the household. An outlet line 20 carries both the activated seawater-borne and the fresh-waterborne waste materials to a series of reaction chambers or vessels 22 which are conveniently located adjacent the the building structure 10. The reaction chambers 22 are shown located above ground and away from the buliding, however, they are equally effective if they are partially buried in the ground, and are in a shed, or are located within the building.

The system ideally would use two or three reaction chambers 22 depending upon the size and occupancy rate of the building 10 although there is no theoretical limit as to how many reaction chambers 22 could be used. Preferably, each reaction chamber 22 is of sufficient size to hold a large quantity of activated seawater and waste material. The MacMahan Island facility described hereinabove, uses 57-gallon drums as reaction chambers and as the filter container. Each reaction chamber 22 includes an inlet pipe 24 located near the top of the chamber and an outlet 26. As indicated hereinabove, a typical vacation cottage household uses two or three reaction chambers.

The outlet 26 of the last reaction chamber 22 in series is connected to a filter container 30 through an inlet pipe 34 having a series of holes 32 to distribute the reacted wastewater over the top surface of a filter bed 36. In a preferred embodiment, the filter container 30 is a 57-gallon drum using a filter bed of ¾ inch crushed stone 36. The crushed stone is mounted on a circular support 38 formed of ¼ or ½ inch mesh hardware cloth which is mounted on four or more free-standing supports 40 preferably made of 12 inch lengths of 4-inch PVC plastic sewer pipe. A small amount of manganese dioxide powder may be placed in each of the reaction chambers 22 and/or into the filter container 30 to serve as a decomposition catalyst for the hydrogen peroxide thereby expediting the release of oxygen.

The final outlet leg of the system is a two inch diameter plastic pipe 42 which is attached to the filter container 30 leading from the bottom and exiting about twelve inches above the bottom. The other end of the pipe 42 leads to the disposal location which preferably would be the tidal or seawater adjacent the installation.

A primary feature of the system is the use of the bypass line 16 which is connected at the inlet end of the system to the valve 15 and which terminates in line 20 just before the first reaction chamber 22 or directly into the first reaction chamber 22. Preferably, the bypass line 16 would include some type of flow restrictor 44, such as a valve or the like, in order to regulate the flow of the activated seawater from the source. The bypass flow of activated seawater insures a continuous supply of seawater having aerobic microorganisms to the reaction chambers to insure continuous aerobic biochemical reaction and solids separation which is independent of the frequency of the household waste systems.

It will be appreciated that numerous modifications may be made in the present system in addition to the particular illustrated embodiment as well be apparent to those skilled in the art.

For example, other sources in addition to hydrogen peroxide may be used for sterilization and oxygen formation; pure oxygen gas and sodium perborate powder being examples. The system is equally well adapted for beach communities and the system could readily be adapted for use in waste treatment systems for oceangoing watercraft.

Having thus described the invention, what I claim and desire to obtain by Letters Patent of the United States is:

1. A process for treating sewage and waste material for making it suitable for discharge into tidal waters comprising the steps of: activating seawater with hydrogen peroxide by dissolving the hydrogen peroxide in said seawater; delivering said activated seawater to a source of waste material and mixing said activated seawater with said waste material; transporting said waste material with said activated seawater mixture to at least one reaction vessel whereby said activated seawater decomposes said waste material; providing a separate continuous supply of said activated seawater to said reaction vessel to insure continuous aerobic biochemical reaction with solids in said reaction vessel; filtering the treated wastewater in a filtering vessel after it is discharged from said reaction vessel and discharging said filtered and treated wastewater to a disposal location.

2. The process of claim 1 wherein said hydrogen peroxide is dissolved in said seawater at a rate of 3 pounds to 30 pounds of hydrogen peroxide per 700 cubic feet by volume of seawater.

3. The process of claim 1 further including the step of adding 10 to 100 grams of manganese dioxide powder to said activated seawater as a decomposition catalyst for said hydrogen peroxide thereby expediting release of oxygen.

4. The process of claim 3 wherein said manganese dioxide powder is added to said activated seawater in said reaction chamber.

5. The process of claim 3 wherein said manganese dioxide powder is added to said activated seawater in said filtering vessel.

6. A wastewater treatment system for treating wastewater and raw sewage with seawater comprising
 a source of a mixture of seawater containing aerobic microorganisms and hydrogen peroxide;
 a first feed line connected from said source to a wastewater location for feeding said seawater and hydrogen peroxide mixture to said wastewater location,
 at least one reaction vessel connected to said wastewater location for collecting, storing and treating solid waterborne wastes with said mixture of seawater containing aerobic microrganisms and hydrogen peroxide,
 a second feed line connected directly between said source and said reaction vessel bypassing said first feed line, said second feed line providing a continuous flow of said mixture of seawater and hydrogen peroxide to said reaction vessel independent of the useage of said wastewater location to insure continuous aerobic biochemical reaction with solid in said reaction vessel, and means for discharging the resulting treated water to a disposal area.

7. The wastewater treatment system of claim 6 further including a filter vessel connected to said reaction vessel for further cleansing and disinfecting said waterborne wastes and seawater and hydrogen peroxide mixture.

8. The system of claim 6 further including a filter means connected between said reaction vessel and said discharging means.

9. The system of claim 8 wherein said source said mixture is a storage tank including means for mixing hydrogen peroxide with the seawter in said storage tank.

10. The system of claim 9 wherein said storage tank is located higher than said wastewater location and said mixture is fed by gravity through said first feed line.

11. The system of claim 6 wherein said wastewater location comprises a building having toilets and wash drains.

12. The system of claim 6 further including flow regulating means for regulating the fluid flow in said second feed line.

* * * * *